Aug. 4, 1959 H. OBERBECK 2,898,558

LINE SECTION

Filed March 11, 1955 2 Sheets-Sheet 1

INVENTOR:
Helmut Oberbeck
BY
Michael S. Striker
agt.

Aug. 4, 1959 H. OBERBECK 2,898,558

LINE SECTION

Filed March 11, 1955 2 Sheets-Sheet 2

INVENTOR:
Helmut Oberbeck
BY
Michael S. Striker
agt.

2,898,558

LINE SECTION

Helmut Oberbeck, Ulm (Danube), Germany, assignor to Firma Telefunken Gesellschaft für Drahtlose Telegraphie m.b.H., Hannover, Germany Application March 11, 1955, Serial No. 493,748

12 Claims. (Cl. 332—2)

The present invention relates to line sections and more particularly relates to variable time delay line sections.

Delay lines are used for many purposes in the electronics industry today. Most of these line sections are fixed line sections. That is, they introduce a fixed time delay into a transmission circuit, usually in high frequency circuits. Variable time delay lines have been used in recent years. These are particularly advantageous in laboratory and related research and development use since one variable time delay line section provides a wide range of time delays to take the place of several fixed delay line sections. Variable time delay lines are also of practical importance in connection with the so-called "time equalizers" which are used in relaying systems for the transmission of television programs to improve the pulse shape. Furthermore such delay lines are also used in radar systems.

Conventional variable delay lines increase or decrease the delay time of a line section by increasing or decreasing the number of windings in the line section. The time delay of conventional variable delay lines is sometimes varied by electrical means, for example, by varying the dielectric or magnetic constants of the line section. The conventional methods, however, of varying the time delay are relatively expensive and in some cases time-consuming.

In accordance with the present invention the electrical length of the line section is continuously variable. This is accomplished by making one or more of the parts of the line section out of a flexible material and by stretching or compressing this flexible part to change the capacity and inductance of the line section while simultaneously maintaining the characteristic impedance of the line section at a constant value.

Accordingly, it is an object of the present invention to provide a new and improved line section.

Another object of the present invention is to provide a new and improved variable time delay line.

Still another object of the present invention is to provide a variable time delay line having a flexible part whose length may be varied to vary the time delay of the delay line.

A further object of the present invention is to provide a variable time delay line which may be coupled with the movable diaphragm of a microphone so that the time delay of the delay line is varied in accordance with the movements of the movable diaphragm.

Yet another object of the present invention is to provide a modulation system using a variable delay line coupled to the movable diaphragm of the microphone so that the time delay of the delay line is varied in accordance with the movements of the movable diaphragm.

With the above objects in view the present invention mainly consists of a line section including an outer forward conductor and an inner return conductor arranged within the outer forward conductor, at least one of the conductors being coiled, flexible and adjustable in its length so as to vary the pitch thereof.

In another embodiment of the invention, the invention includes modulation apparatus having an electron discharge device with at least an anode and a control electrode, means for supplying a positive operating potential to the anode, an anode resistor connected in series between the potential supply means and the anode, and a variable time delay line having an input and an output, the input being connected across the anode resistor and the output being short circuited.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic representation of one embodiment of the present invention;

Fig. 2*a* is a schematic representation of the embodiment of Fig. 1 showing the delay line in its initial unextended state;

Fig. 2*b* is a schematic representation of the embodiment of Fig. 1 showing the delay line in its partially extended state after its time delay has been varied;

Figures 6, 7A, 7B:
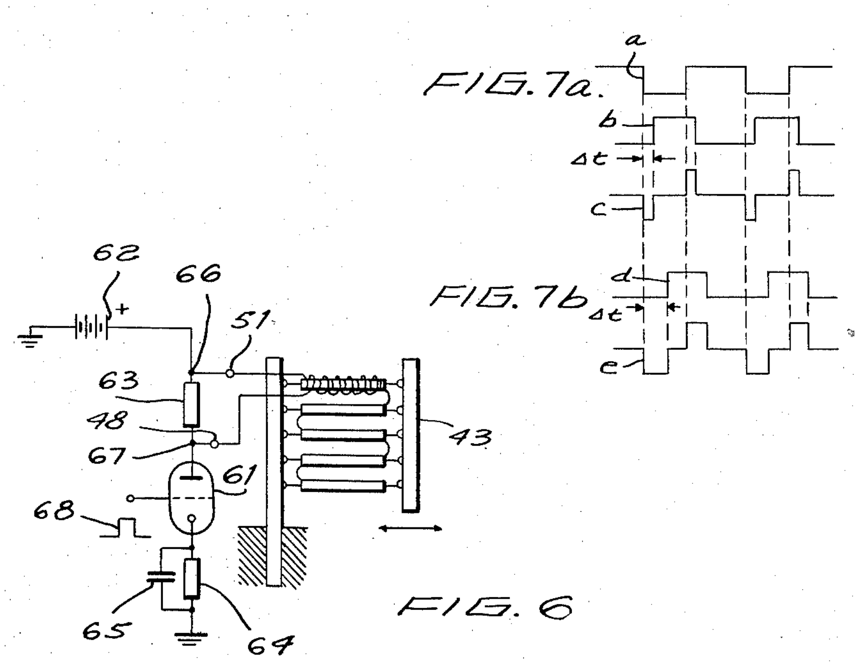
Fig. 6 is a diagrammatic representation of the embodiment shown in Fig. 5 used in conjunction with a modulation system.

Fig. 7*a* is a graphical representation of the wave shape of the voltages appearing at different portions of the circuit of Fig. 6; and Fig. 7*b* is a graphical representation of the wave shape of the voltages appearing at different portions of the circuit of Fig. 6 for larger delay times than shown in Fig. 7*a*.

Figure 1:
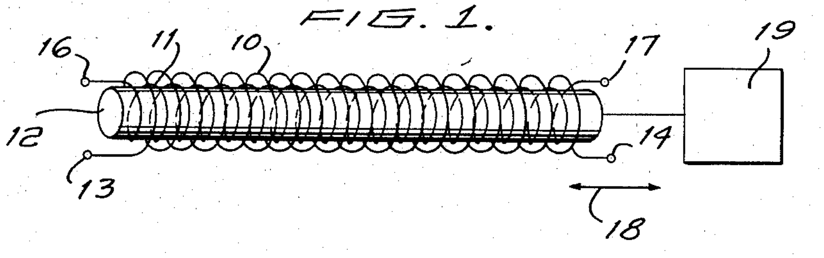

Referring now to Fig. 1 the outer forward conductor 10 and the inner return conductor 11 are shown wound about a core 12. The forward conductor 10 has an input terminal 13 and an output terminal 14 while the return conductor has an input terminal 16 and an output terminal 17. In a manner known in the art each of the conductors possesses an inductance depending, among other things, upon the number of turns per centimeter of length of the coil. Similarly, the capacitance between the windings of the respective conductors depends primarily on the confronting surfaces of the conductor windings.

Accordingly, the inductance and capacitance introduced between the input terminals 13 and 16 and the output terminals 14 and 17 by the illustrated line section depends upon the inductance of each of the conductors and the capacitance thereof. It is also known that the characteristic impedance of the line section depends on the ratio $L/C$ where L is the inductance of the line section and C is the capacitance. In accordance with the present invention the delay time introduced by the line section illustrated in Fig. 1 may be varied by varying the inductance and capacitance thereof while simultaneously maintaining the characteristic impedance at a constant value.

This can be accomplished as illustrated in the embodiment of Fig. 1 by forming the core 12 of a flexible or elastic material. The conductor windings 10 and 11 are substantially fixedly mounted on the body of the core 12 due to the winding tension used during the winding operation. Accordingly, when the elastic core 12 is stretched, for example, the windings move with the core and the pitch of the windings is varied. This movement of the core may be accomplished in the directions indicated by the arrows 18 by a mechanical device 19.

Figure 2A:
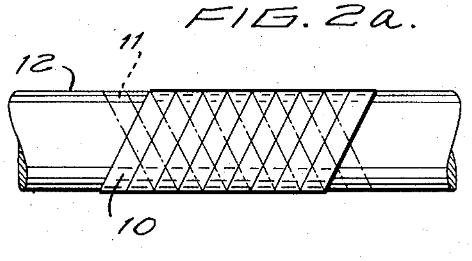
Figure 2B:
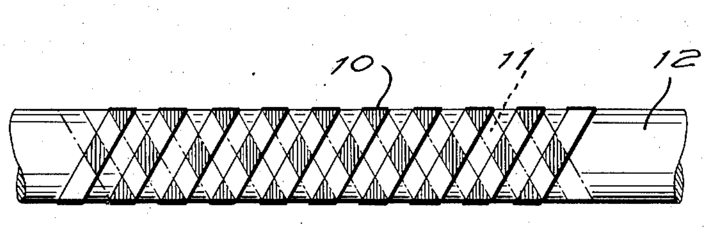

Referring now to Figs. 2a and 2b, the variation of the capacitance of the line section illustrated in Fig. 1 will be explained. In Fig. 2a the forward conductor 10 is shown in the form of a continuous band having a substantially rectangular cross section. This band is shown by the solid black lines. The return conductor 11 is also shown as a continuous band having a substantially rectangular cross section. In Fig. 2a the return conductor 11 is shown by means of dotted lines and it can be seen that conductor 11 is wound on the elastic core 12 in a direction opposite to the conductor 10. The dotted lines are used merely to indicate the different coil windings and not to indicate that any particular portions of the return conductor are hidden from view.

In Fig. 2a the core 12 is shown in its initial unstretched condition so that the adjacent edges of each turn of the conductors 10 and 11, respectively, are next to one another. It can be seen that in Fig. 2a substantially all of the inner surface of the conductor 10 confronts the outer surface of the conductor 11 so that the resulting capacity is dependent upon the total confronting surfaces.

In Fig. 2b, the elastic core 12 has been stretched to twice the length shown in Fig. 2a. Accordingly, the windings of the conductors 10 and 11 which have been wound on the core 12 with a high winding tension, will be moved apart as the core 12 is elongated. After the core 12 has been elongated to substantially twice its length, the pitch of the conductors 10 and 11 will be changed and the adjacent windings will be separated from one another a distance substantially equal to the width of the winding band.

In Fig. 2b, the shaded portions represent areas where the surfaces of the conductors 10 and 11 confront each other. In the clear spaces the windings do not overlap. Accordingly, it can be seen that the confronting surfaces have been decreased substantially by one-half with respect to the confronting surface of the unextended core. Therefore, the capacitance of the line section has been substantially decreased by one-half.

It is also apparent that the inductance of the line section has been decreased by one-half at the same time. This can be shown as follows. It is known that the inductance of a long coil can be represented by the following equation:

$$L_1=kn^2l \tag{1}$$

where $l$ is the length of the coil; $n$ equals the number of windings per centimeter of the coil; and $k$ is a proportionality factor. When the core 12 has been extended from the initial length $l$ to the extended length $2l$ the number of windings per centimeter is half of the original number. Accordingly, the inductance of the extended coil can be represented by the following equation:

$$L_2=k\frac{n^2}{4}2l=\frac{L_1}{2} \tag{2}$$

Accordingly, it is seen that by doubling the length of the line section, its inductance is reduced by one-half and its capacitance is reduced by one-half. This serves to provide a different time delay for a voltage signal applied to the input end of the line section. However, the ratio $L/C$ remains unchanged. Therefore, the characteristic impedance of the line section remains constant.

It is obvious that such an arrangement is highly advantageous since a variable time delay line section of the type described can be used in conjunction with other apparatus and have an initial characteristic impedance necessary for proper matching purposes with the other apparatus. The time delay of the line section constructed in accordance with the principles of the present invention can then be varied while maintaining a constant characteristic impedance necessary for the proper matching with the apparatus connected thereto.

It should be clear that it is not necessary to have an elastic core for the conductor windings. The core may be solid while one or both of the windings may be elastic. In such a case the same results will be obtained by stretching the elastic winding or windings and keeping the core fixed.

Similarly, the windings may both be elastic without any core being required. In such a case the windings are made sufficiently stiff to retain their own shape without the necessity of an inner core.

Figure 3:
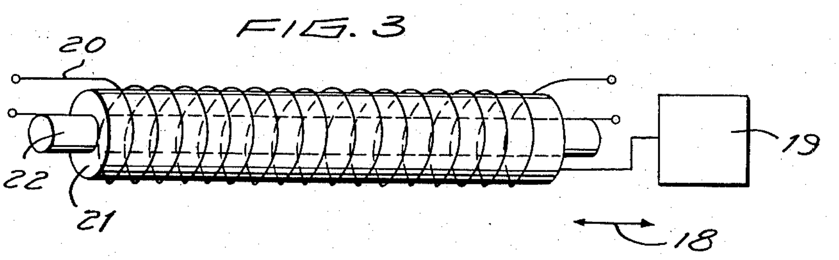
Fig. 3 is a schematic representation of another embodiment of the present invention.

Referring now to Fig. 3, another embodiment of the present invention is illustrated. In this embodiment the outer forward conductor 20 is mounted on a hollow cylindrical elastic core 21. The inner return conductor 22 is disposed coaxially within the hollow core 21. In accordance with the principles of the invention, it has been found that a rubber tube similar to the type used in bicycles can be used for the core 21.

In the embodiment illustrated in Fig. 3 it is apparent that the elastic core 21 can be elongated to change the pitch of the outer conductor 20 and accomplish the advantageous changes in the electrical constants of the line sections as discussed above. Again, it is clear that the outer forward conductor 20 is wound on the core 21 with initial winding pressure sufficient to fixedly mount the winding 20 on the core 21. Therefore, when the elastic core is stretched, the pitch of the conductor 20 will be changed to obtain the advantageous results in accordance with the principles of the present invention. It is evident, that the stretching is made possible if there exists a small space between the inner return conductor 22 and the core 21.

Figures 4, 5:
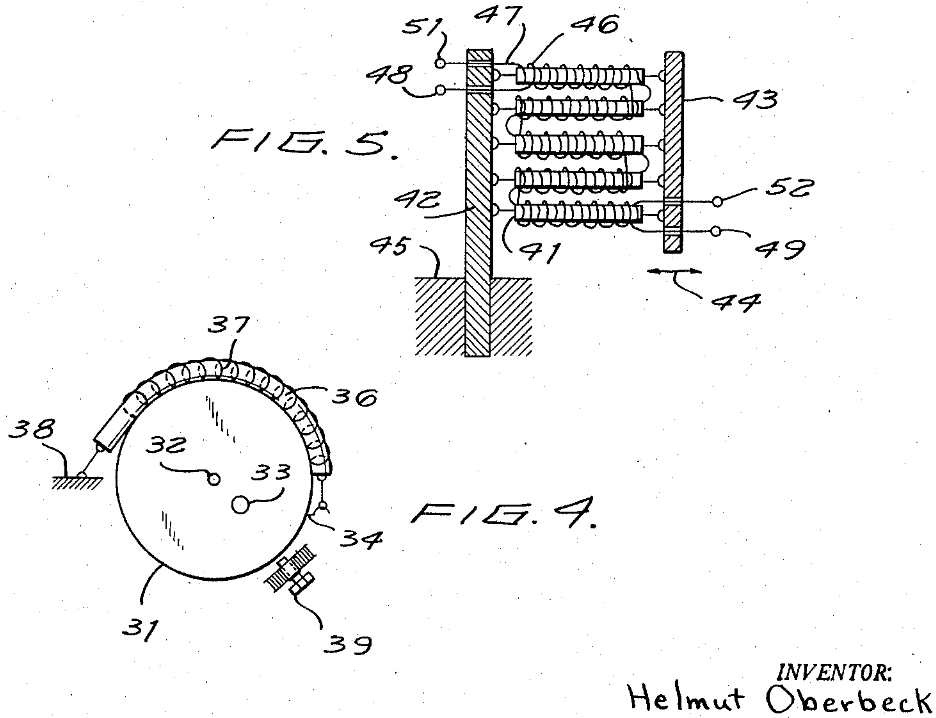
Fig. 4 is a schematic representation of still another embodiment of the present invention.
Fig. 5 is a side view, partially in section of another embodiment of the present invention having a particularly long delay time.

Referring now to Fig. 4, another embodiment of the present invention is illustrated. In this embodiment a rotatable drum 31 is provided which may be rotated about its axis 32 by means of a handle 33. On the surface of the rotatable drum 31 is an extension 34 to which can be fastened one end of the elastic part of the line section. It is clear that if the core 36 is elastic, this end is fastened to the extension 34. On the other hand if the outer forward conductor 37 or the inner return conductor is elastic, one end of these elastic members may also be fastened to the extension 34. The other end of the elastic member or members of the embodiment shown in Fig. 4 is fastened to a fixed member 38.

It can be seen that the time delay of the line section can be varied in accordance with the principles of the present invention by changing the rotated angle of the rotatable drum 31. Any particular point to which the drum has been rotated can be fixed by means of the set screw 39.

Referring to Fig. 5 another embodiment of the variable time delay line section is shown. In this embodiment a plurality of elastic cores 41 are disposed in parallel relation between two plates 42 and 43. One end of each of the cores 41 is respectively connected to the plate 42 which is fixedly mounted in member 45. The other ends of the respective cores 41 are connected to the movable plate 43 which may be moved in the directions indicated by the arrows 44.

The movable plate 43 may be the movable diaphragm of a microphone so that movements of the diaphragm will effect a proportionate movement in the elastic members of the line sections. About each of the cores 41 are wound respectively, forward conductors 46 and inner return conductors 47. The first forward conductor 46 has an input terminal 48 and the last forward conductor has an output terminal 49. The first return conductor has an input terminal 51 and the last return conductor has an output terminal 52. All the forward conductors 46 are shown connected in series with each other and the return conductors 47 are shown connected in series with each other.

Accordingly, any voltage signal applied to the input terminals 48 and 51 of the line section will be delayed an amount proportional to the sum of all the delays introduced by the various elements in series before it is emitted from the output terminals 49 and 52. In this manner a relatively long time delay may be provided. When the movable plate 43 is moved either towards the left or towards the right the elastic parts of the line sections are either stretched or compressed, respectively.

It can be seen that a small movement of the plate 43 will produce a proportionally large change in the line sevtion illustrated in Fig. 5. Accordingly, if the movable plate 43 is the movable diaphragm of a microphone the delay introduced by the delay line can be modulated by the audio frequencies at which the diaphragm 43 is moved. Similarly, any rhythmic movement of the movable plate 43 will introduce a rhythmic change in the delay time of the line section.

Referring now to Fig. 6 a modulation apparatus utilizing the embodiment of the line section illustrated in Fig. 5 will be described. An electron discharge tube 61 is shown with its anode connected to the positive terminal of a direct current potential source 62 through an anode resistor 63. The cathode of the device 61 is connected to ground through the parallel combination of the resistor 64 and the capacitor 65.

Connected to the junction 66 between the anode resistor 63 and the potential source 62 is the input terminal 51 of the delay line described in Fig. 2. The input terminal 48 is connected to the junction 67 between the anode and the anode resistor 63. In this arrangement the output terminals 49 and 52 may be short-circuited and accordingly are not shown.

In operation, when a voltage signal, such as a voltage impulse series as indicated by the rectangular impulse 68, is applied to the control grid of the tube 61, it is amplified and, in the absence of the short-circuited delay line, inverted so that at the junction point 67 it has the shape shown at *a* of Fig. 7*a*. However, when the short-circuited delay line is connected, the output impulses will be reflected from the short-circuited terminals of the line section and its polarity will be reversed so that it will have the wave form indicated in *b* of Fig. 7*a*. It will be noted that a delay time $\Delta t$ will be introduced between the input and the reflected impulses due to the time of travel through the delay line to the short-circuited end thereof and their return. Accordingly, in Fig. 7*a* the impulse series shown at *b* will be slightly delayed in time with respect to the impulse series shown at *a*.

With the short-circuited delay line connected across the anode resistor 63, the input and the reflected impulses will be superimposed resulting in the impulse series *c* shown in Fig. 7*a*. It is apparent that the impulse series *c* represents the sum of the impulse series *a* and *b* which are separated by a time interval $\Delta t$.

In Fig. 7*b* are shown two impulse series *d* and *e* which result from use of a short-circuited delay line section having a longer delay time than that used for the wave form shown in Fig. 7*a*. The impulse series *d* represents the delayed reflected impulse series, each impulse of which is delayed a time interval $\Delta t$ with respect to the amplified impulse series *a*. The impulse series *e* is the result of the superimposition of the impulse series *a* and *d*. It is seen that each impulse of the impulse series *e* has a greater width than each impulse of the impulse series *c*. Therefore, it is apparent that by use of the line section incorporating the principles of the present invention, it is possible to provide pulse or time modulation of applied impulse or sinusoidal voltage signals.

When the plate 43 of the time delay apparatus illustrated in Fig. 6 is the movable diaphragm of a microphone it is clear that the voltage applied to the control electrode of the electron discharge device 61 can be directly modulated by the action of the sound waves on the diaphragm. With the same circuit, if the output ends of the delay line are not short-circuited, the voltage signals applied to the control grid of the electron discharge device 61 can be directly and rhythmically phase modulated for communication systems. Also, with the last-mentioned circuit, the voltage signals applied to the control electrode of the electron discharge device 61 can be modulated with a rhythmically varying modulation, such as used in wobbulators for applying a wobbulating or periodically varying modulation to the transmitted intelligence.

It will be understood that each of the elements described above, or two or more together, may also find a useful application in other types of line sections differing from the types described above.

While the invention has been illustrated and described as embodied in variable time delay line sections, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A variable time delay network, comprising, in combination, a resilient hollow, cylindrical core element; an outer forward conductor element mounted on said core element; an inner return conductor element arranged coaxially within said resilient hollow core element, at least one of said conductors being coiled and adjustable in its length, one of said conductors also being flexible so as to vary the pitch of said coiled conductor, said resilient core element being constructed and arranged so that contractions and expansions thereof change the inductance and capacitance of said time delay network in the same direction by equivalent amounts so that the time delay of said network is changed while the ratio between said inductance and capacitance remains constant; and means for contracting and expanding said resilient core element by predetermined amounts, whenever desired.

2. A variable time delay network, comprising, in combination, a hollow, resilient and cylindrical core element; an outer forward conductor element mounted on said core element; a solid return conductor element arranged coaxially within said hollow core element, said outer conductor being coiled and adjustable in its length so as to vary the pitch thereof, said resilient core element being constructed and arranged so that contractions and expansions thereof change the inductance and capacitance of said time delay network in the same direction by equivalent amounts so that the time delay of said network is changed while the ratio between said inductance and capacitance remains constant; and means for contracting and expanding said resilient core element by predetermined amounts, whenever desired.

3. A variable time delay line section comprising, in combination, a resilient core element; a rotatable element having an outer arcuate surface, one end of said core element being fixedly mounted on said outer surface of said rotatable element; means for fixedly mounting the other end of said core element; an outer forward conductor mounted on said core element; and an inner return conductor element arranged on said core element, at least one of said conductors being coiled, and fixedly mounted on said resilient core element so that rotation of said rotatable element will vary the length of said resilient core element and vary the pitch of said coiled conductor, said resilient core element being constructed and arranged so that contractions and expansions thereof change the inductance and capacitance of said time delay network in the same direction by equivalent amounts so that the time delay of said network is changed while the ratio between said inductance and capacitance remains constant.

4. A variable time delay line section comprising, in combination, a resilient core element; a rotatable element having an outer arcuate surface, one end of said core element being fixedly mounted on said outer surface of said rotatable element; means for fixedly mounting the other end of said core element; an outer forward conductor mounted on said core element; and an inner return conductor element arranged on said core element, said outer forward conductor being coiled, and fixedly mounted on said resilient core element so that rotation of said rotatable element will vary the length of said resilient core element and vary the pitch of said forward conductor, said resilient core element being constructed and arranged so that contractions and expansions thereof change the inductance and capacitance of said time delay network in the same direction by equivalent amounts so that the time delay of said network is changed while the ratio between said inductance and capacitance remains constant.

5. A line section comprising, in combination, a plurality of elastic core elements; a plurality of outer forward conductors, each of said forward conductors being fixedly mounted respectively on one of said plurality of elastic core elements; a plurality of inner return conductors, each of said return conductors being arranged respectively within one of said plurality of forward conductors, at least one of said plurality of conductors being coiled and adjustable in their length; means for connecting all of said plurality of outer forward conductors in series; means for connecting all of said inner return conductors in series; means for fixedly mounting one end of each of said core elements; and means for movably mounting the other end of each of said core elements so as to simultaneously adjust the length of said plurality of coiled conductors and vary the pitch thereof.

6. A line section comprising, in combination, a plurality of elastic core elements disposed in parallel relation, each of said core elements being of the same initial length; a plurality of outer forward conductors, each of said forward conductors being fixedly mounted respectively on one of said plurality of elastic core elements; a plurality of inner return conductors, each of said return conductors being arranged respectively within one of said plurality of forward conductors, at least one of said plurality of conductors being coiled and adjustable in their length; means for connecting all of said plurality of outer forward conductors in series; means for connecting all of said inner return conductors in series; means for fixedly mounting one end of each of said core elements in the same plane; and a microphone having a movable diaphragm for movably mounting the other end of each of said core elements so as to simultaneously adjust the length of said plurality of coiled conductors and vary the pitch thereof whenever said diaphragm is moved.

7. Modulation apparatus comprising, in combination, an electron discharge device having at least an anode and a control electrode; potential supply means for supplying a positive operating potential to said anode; an anode resistor connected in series between said potential supply means and said anode; and a variable time delay network having at least one resilient core element, an outward forward conductor element and an inner return conductor element helically wound about said resilient core element so that said time delay network has a predetermined inductance and capacitance, said resilient core element being constructed and arranged so that contractions and expansions thereof change the inductance and capacitance of said time delay network in the same direction by equivalent amounts so that the time delay of said network is changed while the ratio between said inductance and capacitance remains constant, said time delay network having an input and an output, said input being connected across said anode resistor and said output being short-circuited.

8. Modulation apparatus comprising, in combination, an electron discharge device having at least an anode and a control electrode; potential supply means for supplying a positive operating potential to said anode; an anode resistor connected in series between said potential supply means and said anode; a time delay network having at least one resilient core element, an outer forward conductor and an inner return conductor arranged within said outer forward conductor and supported by said core element, at least one of said conductors being coiled, flexible and adjustable in its length so as to vary the pitch thereof, thereby varying the time delay of said time delay network, said resilient core element being constructed and arranged so that contractions and expansions thereof change the inductance and capacitance of said time delay network in the same direction by equivalent amounts so that the time delay of said network is changed while the ratio between said inductance and capacitance remains constant; means for short-circuiting one end of said forward conductor to the corresponding end of said return conductor; means for connecting the other end of said forward conductor to a junction point between said anode resistor and said potential supply means; and means for connecting the other end of said inner return conductor to the junction between said anode resistor and said anode.

9. Modulation apparatus comprising, in combination, an electron discharge device having at least an anode and a control electrode; potential supply means for supplying a positive operating potential to said anode; an anode resistor connected in series between said potential supply means and said anode; a time delay network having a plurality of resilient core elements, a plurality of outer forward conductors and a plurality of inner return conductors, each of said return conductors being arranged respectively within one of said plurality of forward conductors supported respectively by said resilient core elements, at least one plurality of said pluralities of conductors being coiled, flexible and adjustable in their length so as to vary their pitch and thereby vary the time delay of said time delay network, said resilient core elements being constructed and arranged so that contractions and expansions thereof change the inductance and capacitance of said time delay network in the same direction by equivalent amounts so that the time delay of said network is changed while the ratio between said inductance and capacitance remains constant; means for connecting all of said return conductors in series; means for connecting all of said forward conductors in series; means for short-circuiting the open end of said last forward conductor to the open end of said last return conductor, the open end of said first forward conductor being connected to the junction between said anode resistor and said potential supply means and the open end of said first inner return conductor being connected to the junction between said anode resistor and said anode; and means for varying the pitch of said coiled conductors by contracting and expanding said resilient core elements so as to correspondingly vary the time delay of said time delay network.

10. Modulation apparatus comprising, in combination, an electron discharge device having at least an anode and a control electrode; potential supply means for supplying a positive operating potential to said anode; an anode resistor connected in series between said potential supply means and said anode; a time delay network having at least one resilient core element, an outer forward conductor and an inner return conductor arranged within said outer forward conductor and supported by said core element, at least one of said conductors being coiled, flexible and adjustable in its length so as to vary the pitch thereof, thereby varying the time delay of said time delay network, said resilient core element being constructed and arranged so that contractions and expansions thereof change the inductance and capacitance of said time delay network in the same direction by equivalent amounts so that the time delay of said network is changed while the ratio between said inductance and capacitance remains constant; means for short-circuiting one end of said forward conductor to the corresponding end of said return conductor; means for connecting the other end of said forward conductor to a junction point between said anode resistor and said potential supply means; means for connecting the other end of said inner return conductor to the junction between said anode resistor and said anode; and means for varying the pitch of said coiled conductor by contracting and expanding said resilient core elements so as to correspondingly vary the time delay of said time delay network.

11. Modulation apparatus comprising, in combination, an electron discharge device having at least an anode and a control electrode; potential supply means for supplying a positive operating potential to said anode; an anode resistor connected in series between said potential supply means and said anode; a time delay network having a plurality of resilient core elements, a plurality of outer forward conductors, each of said forward conductors being fixedly mounted respectively on one of said plurality of resilient core elements, and a plurality of inner return conductors, each of said return conductors being arranged respectively within one of said plurality of said forward conductors, at least one plurality of said pluralities of conductors being coiled and adjustable in their length, said resilient core elements being constructed and arranged so that contractions and expansions thereof change the inductance and capacitance of said time delay network in the same direction by equivalent amounts so that the time delay of said network is changed while the ratio between said inductance and capacitance remains constant; means for connecting all of said plurality of outer forward conductors in series; means for connecting all of said inner return conductors in series; means for fixedly mounting one end of each of said core elements; and means for movably mounting the other end of each of said core elements so as to simultaneously adjust the length of said plurality of coiled conductors and vary the pitch thereof by contracting and expanding said resilient core elements.

12. A variable time delay network comprising, in combination, at least one resilient core element; an outer forward conductor element and an inner return conductor element helically wound about said resilient core element so that said time delay network has a predetermined inductance and capacitance, said resilient core element being constructed and arranged so that contractions and expansions thereof change the inductance and capacitance of said time delay network in the same direction by equivalent amounts so that the time delay of said network is changed while the ratio between said inductance and capacitance remains constant; and means for contracting and expanding said resilient core element by predetermined amounts, whenever desired.

References Cited in the file of this patent

UNITED STATES PATENTS

| | | |
|---|---|---|
| 357,054 | Watkins | Feb. 1, 1887 |
| 1,807,995 | Marvel | June 2, 1931 |
| 2,240,849 | Lubcke | May 6, 1941 |
| 2,367,576 | Harvey et al. | Jan. 16, 1945 |
| 2,452,572 | Jago | Nov. 2, 1948 |
| 2,457,212 | Di Toro | Dec. 28, 1948 |